Feb. 1, 1966     G. C. WELCH     3,231,981

BORE GAGE ADAPTERS

Filed Feb. 10, 1964     2 Sheets-Sheet 1

INVENTOR.
GERALD C. WELCH.

BY *F. P. Keiper*

ATTORNEY

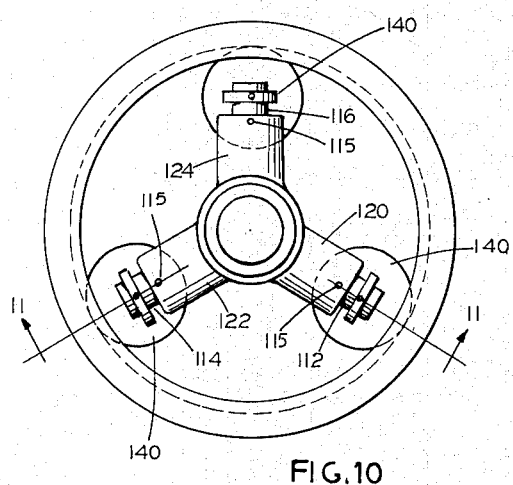
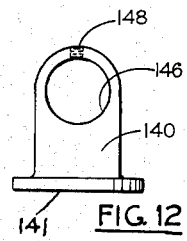
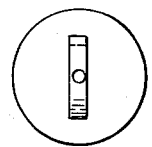
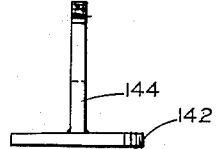
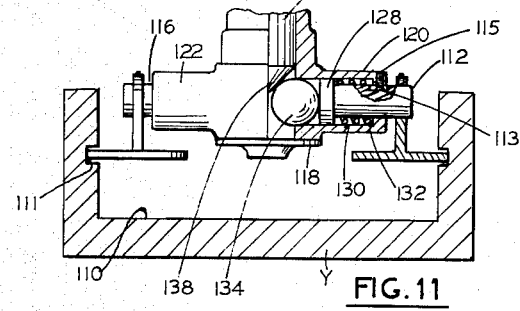
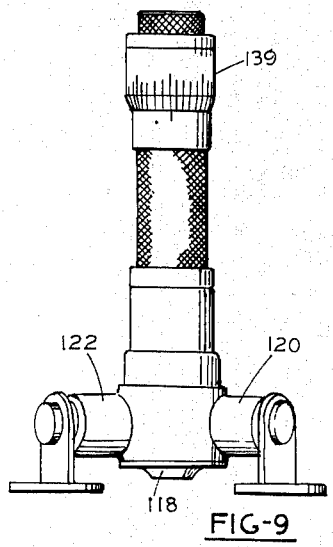
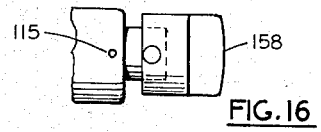
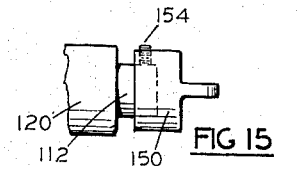
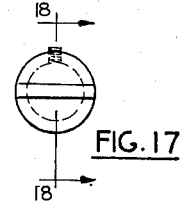
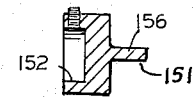

United States Patent Office 3,231,981
Patented Feb. 1, 1966

3,231,981
BORE GAGE ADAPTERS
Gerald Conrad Welch, 44 Titus Court, Apt. E,
Rochester, N.Y.
Filed Feb. 10, 1964, Ser. No. 343,769
1 Claim. (Cl. 33—178)

This invention relates to gages for measuring internal diameters, and more particularly to adapters for such gages to extend their usefulness.

In gages for measuring internal diameters of the type shown in Aldeborgh et al. #2,095,405 and Lauer #1,451,736, serious limitations are presented since the gages are incapable of measuring diameter at the bottom of a bore, or the diameter of narrow internal grooves. The present invention is directed toward extending the usefulness of such gages by providing adapters for the gage pins thereof, which may enter narrow internal grooves, or lie at the bottom of a bore to measure the diameter thereof immediately adjacent the end. The invention comprises a set of adapters having a yoke or socket that may be readily affixed to the gage pins of the gages referred to, and in which the yoke or socket is provided with thin blade like arcuate contacting surfaces adapted to reach into narrow annular grooves to measure the depth thereof. In the yoke type, the arcuate contacting surfaces are disposed at a distance below the pins so as to reach to a plane below the lower end of the gage block or body so that diameter measurements at the bottom of a bore may be made.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Referring to the drawings wherein like reference characters indicate like parts:

FIGURE 9 is a side elevational view of an alternative form of gage having an alternative form of adapter applied to the pins;

FIGURE 10 is a top plan view of the gage of FIGURE 9;

FIGURE 11 is a view partly in elevation and partly in section and taken on the broken section line 11—11 of FIGURE 10;

FIGURE 12 is an end elevational view of the adapter;

FIGURE 13 is a side elevational view of the adapter;

FIGURE 14 is a top plan view of the adapter;

FIGURE 15 is a further form of adapter in side elevation applied to a gage fragmentarily shown;

FIGURE 16 is a plan view of the adapter of FIGURE 15;

FIGURE 17 is an end view of the adapter of FIGURE 15; and

FIGURE 18 is a sectional view taken on the line 18—18 of FIGURE 17.

Figure 2:
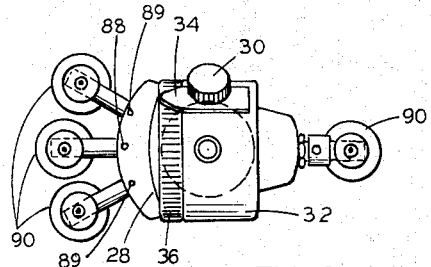
FIGURE 2 is a top plan view of the gage with adapters.
Figure 3:
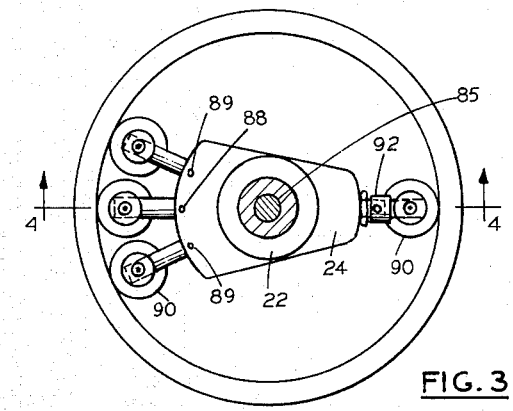
FIGURE 3 is a plan view of the lower portion of the gage, being a section taken substantially on the line 3—3 of FIGURE 1.
Figure 1:
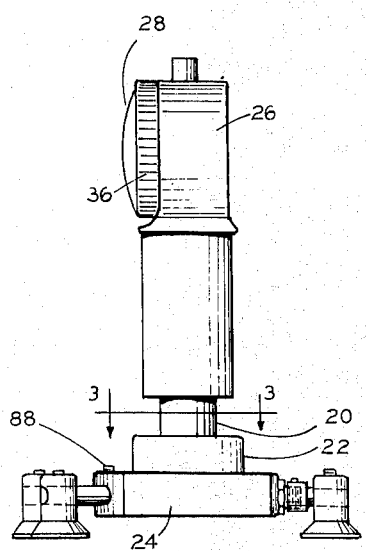
FIGURE 1 is a side elevational view of the gage with adapters applied.
Figure 4:
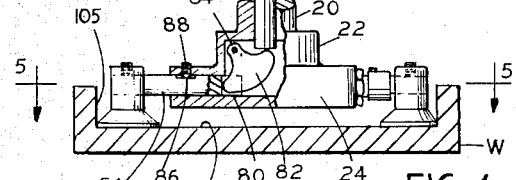
FIGURE 4 is a fragmentary view partly in section taken substantially on the line 4—4 of FIGURE 3.
Figures 6, 7:
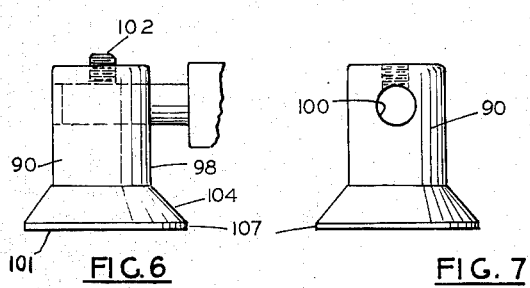
FIGURE 6 is an enlarged side elevational view of an adapter attached to a pin of a fragmentary showing of the gage.
FIGURE 7 is an enlarged front elevational view of the adapter.
Figure 5:
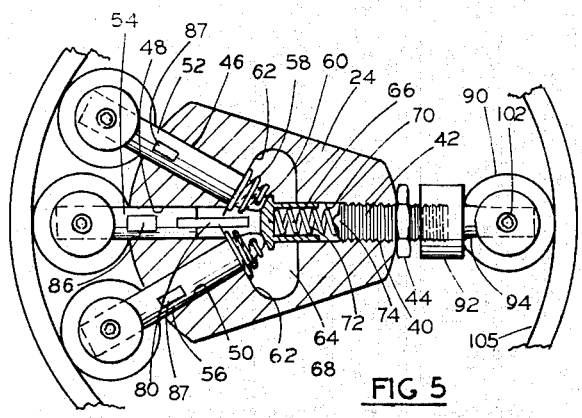
FIGURE 5 is a transverse sectional view taken substantially on the line 5—5 of FIGURE 4.
Figure 8:
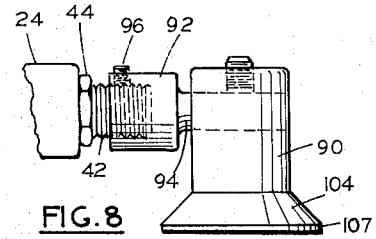
FIGURE 8 is a fragmentary showing of the gage, and an adapter for the fixed contact of the gage.

Referring to FIGURES 1-8 there is shown a typical gage, the operating pins and plungers of which correspond essentially to that shown in Aldeborgh et al. #2,095,405. The gage comprises a vertical tubular body portion 20 extending from a somewhat hollow base 22 affixed to the base member or block 24 housing the pin contact mechanism. The upper end of the body portion 20 extends to a dial indicator 26, which may have a rotatable indicator, and rotatable dial (now shown) in a dial bezel ring 28, which may be held in any desired position by a bezel holding finger 34 adapted to bear against and engage the knurling 36 of the bezel to hold the same against rotation about a horizontal axis, when set as desired. Pressure of the finger 34 on the knurling is regulated by a thumbscrew 30 threaded into the casing 32.

The housing block 24 contains a bore 40 in which is contained a threaded adjustable contact pin 42, held in any set position by a lock nut 44. The block also is provided with three bores 46, 48 and 50 in which slidable contact pins 52, 54 and 56 are disposed. Each of the pins 52 and 56 are provided on their inner ends with conical retraction springs 58, one end of which is hooked into an aperture 60 in the inner end of the respective pins, and the other end of which seats on the wall 62 of the recess 64. Both pins 52 and 56 are urged outwardly by a plunger 66 having symmetrically inclined faces 68 disposed normal to the axes of the pins 52 and 56. Such plunger is hollow and slidable in the unthreaded end 70 of the bore 40. A compression spring 72 extends into the hollow of the plunger and is centered on a central projection 74 on the pin 42. The spring 72 overpowers the combined effect of both springs 58.

The center pin 54 which is aligned with the pin 42, has a notch 80 on its inner end which engages a bell lever 82 pivoted as at 84 in the base 22, and the bell lever engages the lower end of the dial indicator actuating push rod 85, which is slidably disposed in the tubular body portion 20. Such rod 85 may be urged downwardly by spring means not shown in the upper part of the gage, as will be understood in the art. A flat or keyway 86 on the top side of the pin 54, slidably engaging the end of a setscrew 88 may be employed to prevent rotation and limit the movement of the pin 54, and keyways 87 and setscrews 89 may prevent pins 52 and 56 from rotating.

In order to render the gage of the type shown in #2,095,405, capable of reading diameters at the bottom of a cylindrical bore, as in the work piece W, the pins 52, 54 and 56 may be lengthened if necessary, and each fitted with an adapter 90. The threaded contact pin 42 is provided with a threaded socket 92 having a cylindrical shank 94 of the same diameter as the pins 52, 54 and 56, and the socket is provided with a setscrew 96 to lock it in position on the pin 42.

The adapters 90, four of which are employed, all being alike, comprise a cylindrical body portion 98 having a transverse bore 100 forming a yoke to receive the pins 52, 54 and 56, and shank 94, and a setscrew 102 for locking the adapters on their respective pins and the shank. The lower ends of the adapters are provided with frustro conical foot portions 104 having true cylindrical contact edges 107 disposed in a plane below the body block 24 so that the gage is rendered capable of measuring an internal bore such as 105, immediately adjacent the bottom 107 thereof.

It will be understood that the gage pins 52 and 56 are symmetrically disposed about the pin 54, and are thrust equally outward to act as centering devices when engaging a cylindrical wall and that the adapters affixed thereto will each be equally spaced from the inner ends of the pins 52 and 56, whereby to assure that the gage pin 42, and pin 54 will lie on a diameter of the bore being measured.

In the modified form of FIGURES 9–14, a gage of the general type shown in Lauer #1,451,736 is shown provided with adapters for measuring the bottom 110 of a bore, or an annular groove such as 111 in a bore, of a work piece Y. Such a gage is provided with three radial contact pins 112, 114 and 116 slidably disposed in a base block 118 on axes spaced 120 degrees and of suitable length. The base block has radial bosses 120, 122 and 124, in each of which is slidably disposed the pins 112, 114 and 116. Each pin such as 112 may have a head 128, slidable in the bore 130 of each boss 120, 122 and 124, and a light compression spring 132, may urge the pins 112, 114 and 116 inwardly. A ball 134 is disposed in each of the bores 130 behind each of the pins 112, 114 and 116, and the three balls engage the conical end 138 of a vertically sliding gage rod 136. Thus all three pins 112, 114 and 116 are caused to be projected radially by equal amounts, upon the downward movement of the rod 136, such downward or upward movement being affected by rotation of the indicator sleeve 139, by means not herein shown, but as is well understood in the art. To prevent rotation of the pins 112, 114 and 116, a flat or keyway 113 is formed in each, and a small setscrew 115 positioned in each of the bosses 120, 122 and 124 engages its respective keyway or flat.

In order to render such a gage capable of measuring the diameter of annular grooves, or the diameter of the bottom of a bore, the pins 112, 114 and 116 may be lengthened as necessary, and provided with adapters 140, all three adapters being alike. Each adapter has a circular disk portion 142, and a yoke portion 144, the latter having a bore 146 to receive a gage pin such as 112, 114 or 116, and a setscrew 148. The peripheral edge surface 142 of the disk portion may be a frustum of a sphere of the same diameter as the overall diameter of the disk.

A modified adapter is shown in FIGURES 15–18 for measuring groove depths. Each adapter comprises a socket portion 150, having a bore 152 to receive a gage pin such as 112, and a setscrew 154 to lock the socket portion in position. The socket portion is provided with a blade portion 156 having a rounded gaging edge 158 in the form of an arc of a radius less than the diameter to be gaged. Three such adapters are applied to the pins 112, 114 and 116 of the gage, with the blades disposed in the same plane.

It will be seen that each form of the adapter includes a body portion 90, 140, or 150, and that each form has extending from the body portion an arcuate work engaging contact portion or edge 107, 142 or 158 of less thickness than the diameter of the apertures 100, 146 or 152, and that each form has a planar surface such as 101, 141, or 151 that lies in a plane which is parallel to the axis of the apertures 100, 146 or 152. It will further be seen that the arcuate edges 107, 142 or 158 are on radii, the center of which lies in a plane that is perpendicular to the surfaces 101, 141 or 151 and includes the axis of the apertures 100, 146 or 152.

While the adapters of FIGURES 1–8 have been shown in connection with a four pin gage, and those of FIGURES 10–18 have been shown in connection with a three pin star type gage, it will be understood that by providing gage pins of suitable length, any one of the forms of adapters may be applied to either type of gage, four in number being required for the four pin gage, while three only are required for the star gage.

While several forms of the invention have been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

An adapter for the gaging pins of an internal diameter measuring gage having at least three cylindrical work contact gaging pins lying on axes in a common plane, said adapter comprising a cylindrical body portion having a cylindrical aperture lying on an axis transverse to and intersecting the axis of the body portion to receive a gage pin, a threaded bore in said adapter coaxial with said body portion and extending radially outwardly to one end of the body portion from said cylindrical aperture and having a gaging pin engaging setscrew therein, said body portion at its other end having extended therefrom an integral portion for work gaging contact, said work gaging contact portion being provided with a conical enlargement coaxial with the body portion, and a thin coaxial cylindrical contact surface, the lower circular marginal edge of which lies in a planar end surface of the adapter disposed transversely to the body portion axis.

References Cited by the Examiner
UNITED STATES PATENTS

| | | | |
|---|---|---|---|
| 1,797,121 | 3/1931 | Bohn | 33—199 |
| 2,679,107 | 5/1954 | Gondek | 33—178 |
| 2,814,882 | 12/1957 | Tillman | 33—167 |

ROBERT B. HULL, *Primary Examiner.*

ISAAC LISANN, W. K. QUARLES, JR.,
*Assistant Examiners.*